No. 825,348. PATENTED JULY 10, 1906.
E. F. PRICE.
PROCESS OF PRODUCING LOW CARBON FERRO ALLOYS.
APPLICATION FILED NOV. 14, 1905.

Witnesses:

Inventor:
Edgar F. Price,
by Byrnes & Townsend
Att'ys.

UNITED STATES PATENT OFFICE.

EDGAR F. PRICE, OF NIAGARA FALLS, NEW YORK.

PROCESS OF PRODUCING LOW-CARBON FERRO ALLOYS.

No. 825,348.  Specification of Letters Patent.  Patented July 10, 1906.

Application filed November 14, 1905. Serial No. 287,356.

*To all whom it may concern:*

Be it known that I, EDGAR F. PRICE, a citizen of the United States, residing at Niagara Falls, in the county of Niagara and State of New York, have invented certain new and useful Improvements in Processes of Producing Low-Carbon Ferro Alloys, of which the following is a specification.

This process is designed for the production of low-carbon ferrochromium, ferromanganese, ferrotitanium, ferrovanadium, and similar alloys, and contemplates the use of ferrosilicon as a reducing agent. It is possible to electrically produce this silicid with a silicon content of fifty per cent. and upward and very low in carbon. According to the present invention the production of low-carbon ferro alloys is effected by a continuous operation comprising two stages. In the first stage ferrosilicon high in silicon and low in carbon is produced by electrically smelting a charge of silica, iron ore, or iron and carbon. The molten silicid is tapped from the smelting-furnace and allowed to solidify. The ingot is then broken into fragments, which are mixed with a granular body of the compound to be reduced—for example, chromite—and the mixture is smelted in an electric-arc furnace. A basic flux, such as lime, is preferably mixed with the charge to convert the silica produced by the reduction of oxid ores into a fusible slag.

Suitable apparatus for carrying out the process is shown in the accompanying drawings, in which—

Figure 1:
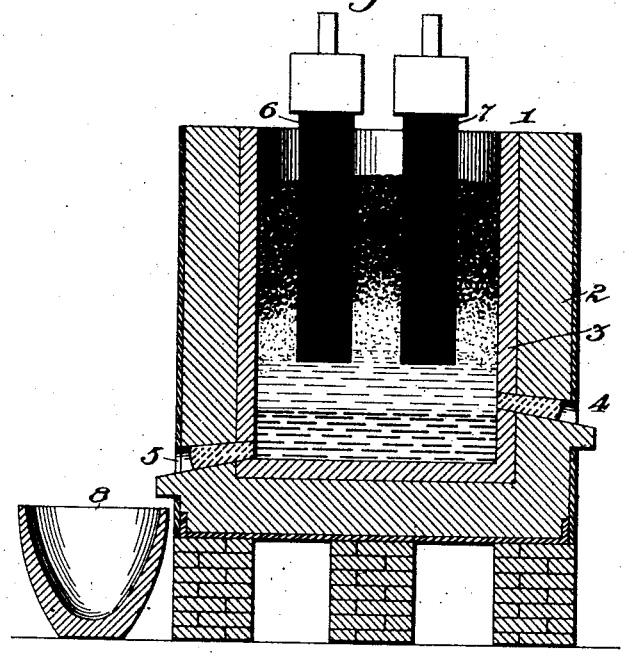
Figure 2:
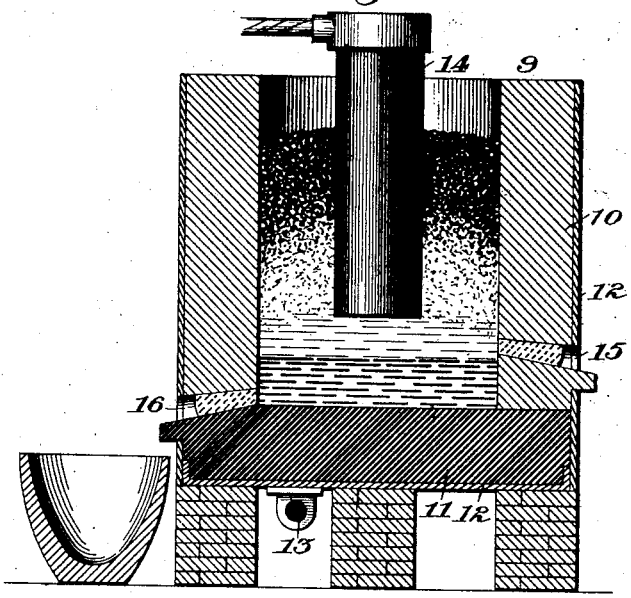

Figure 1 is an axial section of the furnace for producing the ferrosilicon, and Fig. 2 is an axial section of the arc-furnace for utilizing the ferrosilicon to effect reduction.

The smelting-furnace 1 shown in Fig. 1 comprises a body 2, of fire-brick or magnesia, with a lining 3, of refractory material, such as carborundum, siloxicon, silica, or carbon. Tap-holes 4 5 for slag and metal extend through the side walls at different heights. Carbon electrodes 6 7 of opposite polarity depend into the furnace. In employing this furnace to carry out the first stage of the process an arc is established between the electrodes or between each electrode and the carbon lining 3, if used, and the charge—for example, a mixture of finely-ground silica, iron ore, and coke, the silica and carbon preferably being in relatively large amount—is fed in. As reduction progresses the slag is withdrawn at intervals through the tap-hole 4, and the alloy is intermittently tapped into a casting-pot 9, and more of the charge mixture is fed into the furnace as required.

In the second stage of the process the cast ingot of ferrosilicon is broken into pieces, and the fragments are mixed with the ore to be reduced and a flux. The mixture is then charged into the furnace shown in Fig. 2. This furnace has a body 10 of refractory material, such as chromite or magnesia, and a hearth 11 of carbon, surrounded by a metal casing 12, having an electric terminal 13. The carbon hearth constitutes one electrode, and the other electrode is a depending carbon rod 14. Tap-holes 15 16 for slag and metal extend through the side walls at different heights. In employing this furnace to carry out the second stage of the process an arc is established between the depending electrode and the carbon hearth, and a small amount of the charge—for example, a mixture of chromite, ferrosilicon, and lime—is fed in. The furnace is then gradually filled until in its normal working condition the depending electrode is embedded in the charge, as illustrated. As the iron and chromium are reduced a layer of molten ferrochromium collects in the bottom of the furnace and may be removed from time to time through the tap-hole 16. When a considerable layer of slag collects upon the metal, it may be removed through the tap-hole 15. It will be seen that the deep body of the charge surrounding the depending electrode effectively protects it from oxidation and retains the heat within the furnace, both increasing the production of metal and maintaining the slag in a molten condition without especial attention. The use of this deep body is made possible by, and makes it important to employ, the minimum potential difference between the electrode-terminals to prevent excessive waste of current by shunting through the charge. The furnace is operated continuously, the metal and slag being drawn off and the charge mixture added as required. A clean separation between the metal and slag is usually effected by tapping them out at different levels and always leaving a certain amount of each within the furnace. The second stage of the process may obviously be carried out in a furnace having two depending electrodes of opposite polarity.

This process enables a ferro alloy containing a minimum or predetermined low percentage of carbon to be continuously produced at relatively low cost, the use of a charge containing a large percentage of silica and carbon producing a silicid low in carbon and serving as an effective reducing agent.

I claim—

1. The process of producing low-carbon ferro alloys, which consists in providing a charge containing ferrosilicon and a compound of a metal reducible by silicon and alloyable with iron, establishing an electric arc within the charge, surrounding the zone of reduction and protecting the electrodes from the oxidizing effect of the atmosphere by a considerable body of the charge, tapping the resulting slag and ferro alloy from the furnace, and supplying the charge mixture as required, as set forth.

2. The process of producing low-carbon ferro alloys, which consists in providing a charge containing ferrosilicon, an oxidized compound of a metal reducible by silicon and alloyable with iron, and a basic flux, establishing an electric arc within the charge, surrounding the zone of reduction and protecting the electrodes from the oxidizing effect of the atmosphere by a considerable body of the charge, tapping the resulting slag and ferro alloy from the furnace, and supplying the charge mixture as required, as set forth.

3. The process of producing low-carbon ferro alloys, which consists in providing a charge containing ferrosilicon and a compound of a metal reducible by silicon and alloyable with iron, establishing an electric arc within the charge, surrounding the zone of reduction and protecting the electrodes from the oxidizing effect of the atmosphere by a considerable body of the charge, tapping the resulting slag and ferro alloy from the furnace at different levels, and supplying the charge mixture as required, as set forth.

4. The process of producing low-carbon ferro alloys, which consists in providing a charge containing ferrosilicon, an oxidized compound of a metal reducible by silicon and alloyable with iron, and a basic flux, establishing an electric arc within the charge, surrounding the zone of reduction and protecting the electrodes from the oxidizing effect of the atmosphere by a considerable body of the charge, tapping the resulting slag and ferro alloy from the furnace at different levels, and supplying the charge mixture as required, as set forth.

5. The process of producing low-carbon ferro alloys, which consists in providing a charge containing ferrosilicon and a compound of a metal reducible by silicon and alloyable with iron, establishing an electric arc within the charge, surrounding the zone of reduction and protecting the electrodes from the oxidizing effect of the atmosphere by a considerable body of the charge, maintaining between the electrodes the minimum potential difference requisite to effect reduction, thereby substantially preventing loss of electric current by leakage through the charge, separately tapping the resulting slag and ferro alloy from the furnace, and supplying the charge mixture as required, as set forth.

6. The process of producing low-carbon ferro alloys, which consists in providing a charge containing ferrosilicon, an oxidized compound of a metal reducible by silicon and alloyable with iron, and a basic flux, establishing an electric arc within the charge, surrounding the zone of reduction and protecting the electrodes from the oxidizing effect of the atmosphere by a considerable body of the charge, maintaining between the electrodes the minimum potential difference requisite to effect reduction, thereby substantially preventing loss of electric current by leakage through the charge, separately tapping the resulting slag and ferro alloy from the furnace, and supplying the charge mixture as required, as set forth.

7. The process of producing low-carbon ferrochromium, which consists in providing a charge containing ferrosilicon and a compound of chromium, establishing an electric arc within the charge, surrounding the zone of reduction and protecting the electrodes from the oxidizing effect of the atmosphere by a considerable body of the charge, tapping the resulting slag and ferro alloy from the furnace, and supplying the charge mixture as required, as set forth.

8. The process of producing low-carbon ferrochromium, which consists in providing a charge containing ferrosilicon, an oxidized compound of chromium, and a basic flux, establishing an electric arc within the charge, surrounding the zone of reduction and protecting the electrodes from the oxidizing effect of the atmosphere by a considerable body of the charge, tapping the resulting slag and ferro alloy from the furnace, and supplying the charge mixture as required, as set forth.

9. The process of producing low-carbon ferrochromium, which consists in providing a charge containing ferrosilicon and a compound of chromium, establishing an electric arc within the charge, surrounding the zone of reduction and protecting the electrodes from the oxidizing effect of the atmosphere by a considerable body of the charge, tapping the resulting slag and ferro alloy from the furnace at different levels, and supplying the charge mixture as required, as set forth.

10. The process of producing low-carbon ferrochromium, which consists in providing a charge containing ferrosilicon, an oxidized compound of chromium, and a basic flux, establishing an electric arc within the charge, surrounding the zone of reduction and protecting the electrodes from the oxidizing effect of the atmosphere by a considerable body of the charge, tapping the resulting slag and ferro alloy from the furnace at different levels, and supplying the charge mixture as required, as set forth.

11. The process of producing low-carbon ferrochromium, which consists in providing a charge containing ferrosilicon and a compound of chromium, establishing an electric arc within the charge, surrounding the zone of reduction and protecting the electrodes from the oxidizing effect of the atmosphere by a considerable body of the charge, maintaining between the electrodes the minimum potential difference requisite to effect reduction, thereby substantially preventing loss of electric current by leakage through the charge, separately tapping the resulting slag and ferro alloy from the furnace, and supplying the charge mixture as required, as set forth.

12. The process of producing low-carbon ferro chromium, which consists in providing a charge containing ferrosilicon, an oxidized compound of chromium, and a basic flux, establishing an electric arc within the charge, surrounding the zone of reduction and protecting the electrodes from the oxidizing effect of the atmosphere by a considerable body of the charge, maintaining between the electrodes the minimum potential difference requisite to effect reduction, thereby substantially preventing loss of electric current by leakage through the charge, separately tapping the resulting slag and ferro alloy from the furnace, and supplying the charge mixture as required, as set forth.

In testimony whereof I affix my signature in presence of two witnesses.

EDGAR F. PRICE.

Witnesses:
G. E. Cox,
D. Burgess.